(12) United States Patent
Stern et al.

(10) Patent No.: US 9,894,064 B2
(45) Date of Patent: *Feb. 13, 2018

(54) BIOMETRIC AUTHENTICATION

(71) Applicant: AT&T Intellectual Property II, L.P., Atlanta, GA (US)

(72) Inventors: Benjamin J. Stern, Morris Township, NJ (US); Jay Gordon Wilpon, Warren, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,731

(22) Filed: Jul. 22, 2016

(65) Prior Publication Data
US 2016/0330198 A1 Nov. 10, 2016

Related U.S. Application Data

(63) Continuation of application No. 13/886,299, filed on May 3, 2013, now Pat. No. 9,426,150, which is a continuation of application No. 11/274,266, filed on Nov. 16, 2005, now Pat. No. 8,458,465.

(51) Int. Cl.
*H04L 29/06* (2006.01)
*G06F 21/32* (2013.01)
*G06F 17/30* (2006.01)

(52) U.S. Cl.
CPC .... *H04L 63/0861* (2013.01); *G06F 17/30867* (2013.01); *G06F 21/32* (2013.01); *H04L 63/0853* (2013.01)

(58) Field of Classification Search
CPC ......... G06F 21/6218; G06F 2221/2113; G06F 12/1491; H04L 63/105; H04L 63/20
See application file for complete search history.

(56) References Cited

U.S. PATENT DOCUMENTS

| 4,525,793 A | 6/1985 | Stackhouse |
| 4,757,525 A | 7/1988 | Matthews et al. |
| 4,998,279 A | 3/1991 | Weiss |
| 5,613,012 A | 3/1997 | Hoffman et al. |
| 5,717,743 A | 2/1998 | McMahan et al. |
| 5,940,793 A | 8/1999 | Attwater et al. |
| 6,094,632 A | 7/2000 | Hattori |

(Continued)

OTHER PUBLICATIONS

Kumari et al, Implementation of a voice-based biometric system, 101 pages.

(Continued)

*Primary Examiner* — Mahfuzur Rahman
(74) *Attorney, Agent, or Firm* — Scott P. Zimmerman, PLLC

(57) ABSTRACT

A biometric authentication system is disclosed that provides a trusted third party biometric authentication capability for independent confirmation of identity of parties. A repository of biometric templates for registered parties is disclosed that permit a biometric authenticator to perform independent authentication services for other parties by matching received biometric information against biometric information in the repository, or by providing requested biometric information.

20 Claims, 7 Drawing Sheets

(56) References Cited

U.S. PATENT DOCUMENTS

| | | | |
|---|---|---|---|
| 6,182,076 B1 | 1/2001 | Yu et al. | |
| 6,317,834 B1 | 11/2001 | Gennaro et al. | |
| 6,421,672 B1 | 7/2002 | McAllister et al. | |
| 6,510,415 B1 * | 1/2003 | Talmor | G10L 17/00 704/246 |
| 6,909,708 B1 | 6/2005 | Krishnaswamy et al. | |
| 6,928,546 B1 * | 8/2005 | Nanavati | G07C 9/00087 713/159 |
| 7,007,300 B1 | 2/2006 | Weber et al. | |
| 7,225,338 B2 | 5/2007 | Khan et al. | |
| 7,277,891 B2 | 10/2007 | Howard et al. | |
| 7,305,562 B1 | 12/2007 | Bianco et al. | |
| 7,613,659 B1 | 11/2009 | Hoffman et al. | |
| 7,856,558 B2 | 12/2010 | Martin et al. | |
| 7,861,312 B2 | 12/2010 | Lee et al. | |
| 8,234,494 B1 | 7/2012 | Bansal et al. | |
| 8,533,485 B1 | 9/2013 | Bansal et al. | |
| 8,655,789 B2 | 2/2014 | Bishop et al. | |
| 2001/0036297 A1 | 11/2001 | Ikegami et al. | |
| 2001/0056349 A1 * | 12/2001 | St. John | G07C 9/00158 704/270 |
| 2002/0104027 A1 | 8/2002 | Skerpac | |
| 2002/0188854 A1 | 12/2002 | Heaven | |
| 2003/0050777 A1 | 3/2003 | Walker, Jr. | |
| 2003/0126121 A1 | 7/2003 | Khan et al. | |
| 2003/0135740 A1 * | 7/2003 | Talmor | G06F 21/32 713/186 |
| 2003/0220858 A1 * | 11/2003 | Lam | G06Q 30/04 705/35 |
| 2004/0136386 A1 | 7/2004 | Miller et al. | |
| 2004/0162726 A1 | 8/2004 | Chang | |
| 2004/0172535 A1 | 9/2004 | Jakobsson et al. | |
| 2004/0249953 A1 | 12/2004 | Fernandez et al. | |
| 2005/0033991 A1 * | 2/2005 | Crane | H04L 63/1433 726/4 |
| 2005/0039056 A1 | 2/2005 | Bagga | |
| 2005/0170326 A1 | 8/2005 | Koehler et al. | |
| 2005/0273626 A1 | 12/2005 | Pearson et al. | |
| 2006/0090079 A1 * | 4/2006 | Oh | G07C 9/00087 713/186 |
| 2006/0104485 A1 | 5/2006 | Miller et al. | |
| 2006/0206724 A1 * | 9/2006 | Schaufele | G06F 21/32 713/186 |
| 2006/0282671 A1 | 12/2006 | Burton | |
| 2007/0009140 A1 | 1/2007 | Jitsui et al. | |
| 2007/0055517 A1 | 3/2007 | Spector | |
| 2007/0226511 A1 | 9/2007 | Wei et al. | |
| 2010/0044430 A1 * | 2/2010 | Song | G06Q 20/04 235/379 |
| 2010/0061534 A1 | 3/2010 | Wang et al. | |
| 2013/0132091 A1 | 5/2013 | Skerpac | |

OTHER PUBLICATIONS

Heck, Larry P., "On the Deployment of Speaker Recognition for Commericial Applications: Issues and Best Practices", International Biometrics Consortium, Sep. 23, 2003, 47 pages.

Liu et al., "A Practical Guide to Biometric Security Technology," IT Pro, Jan. 2001.

* cited by examiner

| Identification 1 | Biometric Data | Recordation Date/Time | Biometric Template |
|---|---|---|---|
| Retina Scan | filename 1 | 08-12-94; 4:25 pm | filename 2 |
| Finger Print | · | · | · |
| Facial Image | · | · | · |
| Voice Print | · | · | · |
| ··· | · | · | · |

Fig. 3

| Group Identifier n | Identity 1 | Identity 2 | ... | Identity m1 | Group Identifier n+1 | Identity 1 | Identity 2 | ... | Identity m2 | ••• | Group Identifier n+p | Identity 1 | Identity 2 | ... | Identity mp |

BIOMETRIC AUTHENTICATION

CROSS-REFERENCE TO RELATED APPLICATIONS

This application is a continuation of U.S. application Ser. No. 13/886,299 filed May 3, 2013 and since issued as U.S. Pat. No. 9,426,150, which is a continuation of U.S. application Ser. No. 11/274,266 filed Nov. 16, 2005 and since issued as U.S. Pat. No. 8,458,465, with both applications incorporated herein by reference in their entireties.

BACKGROUND

Determining identity of an individual is often required to ensure that transaction between parties may be protected. Thus, technology is required to provide authentication for use in transactions.

SUMMARY

A biometric authentication system is disclosed that provides a trusted third party biometric authentication capability for independent confirmation of identity of individuals. The biometric authentication system may include a biometric authenticator that has a repository of biometric templates for registered individuals. Thus, when registered individuals are engaged in transactions, their identities may be confirmed by comparing their biometric data with biometric templates stored in the repository. A single set of biometric templates may be used to confirm identities for transactions with any number of organizations.

For example, when traveling, a registered party may desire to cash a personal check in a foreign country. A foreign bank may request from the registered party biometric data such as a retina scan, a fingerprint, a facial scan, an ear scan, etc. The captured biometric data together with an identification such as a name or a social security number or its equivalent, for example, may be transmitted to the biometric authenticator. The biometric authenticator may compare the received biometric data with biometric templates corresponding to the identified person. If a match is obtained, then the biometric authenticator may return an authentication certificate to the bank so that bank may be confident that the party is not an imposter and can proceed to cash the check after verifying that sufficient funds are in the checking account, for example.

Biometric templates may be trained by capturing biometric data from registering parties during registration using biometric data capture devices such as retina scanners, fingerprint recorders, camera's, microphones, ear scanners, DNA profilers, etc. A template may be a pattern, a model, etc., that is trained using biometric data such as ones obtained during registration and may be used to verify authenticity of received biometric data during authentication. Templates may be stored in the repository of the biometric authenticator so that upon request, the templates may be used to authenticate a party by comparing supplied biometric data against the biometric templates.

Security may be increased by using text-independent speaker verification (SV) where a party is requested to speak a phrase that may be unique for each authentication event to generate an audio input, for example. The audio input may be digitized into a voice print and features of the voice print may be extracted and compared against a stored voice print template. Additionally, a voice print may be converted into an audio signal for authentication by comparing samples of a party's recorded speech against the audio signal provided by a party when speaking a phrase.

BRIEF DESCRIPTION OF THE DRAWINGS

The invention is described in detail with reference to the following figures, wherein like numerals reference like elements, and wherein:

FIG. 3 shows an exemplary data structure in a repository for biometric data;

FIG. 4 shows an exemplary table of group identities;

DETAILED DESCRIPTION OF EMBODIMENTS

Figure 1:
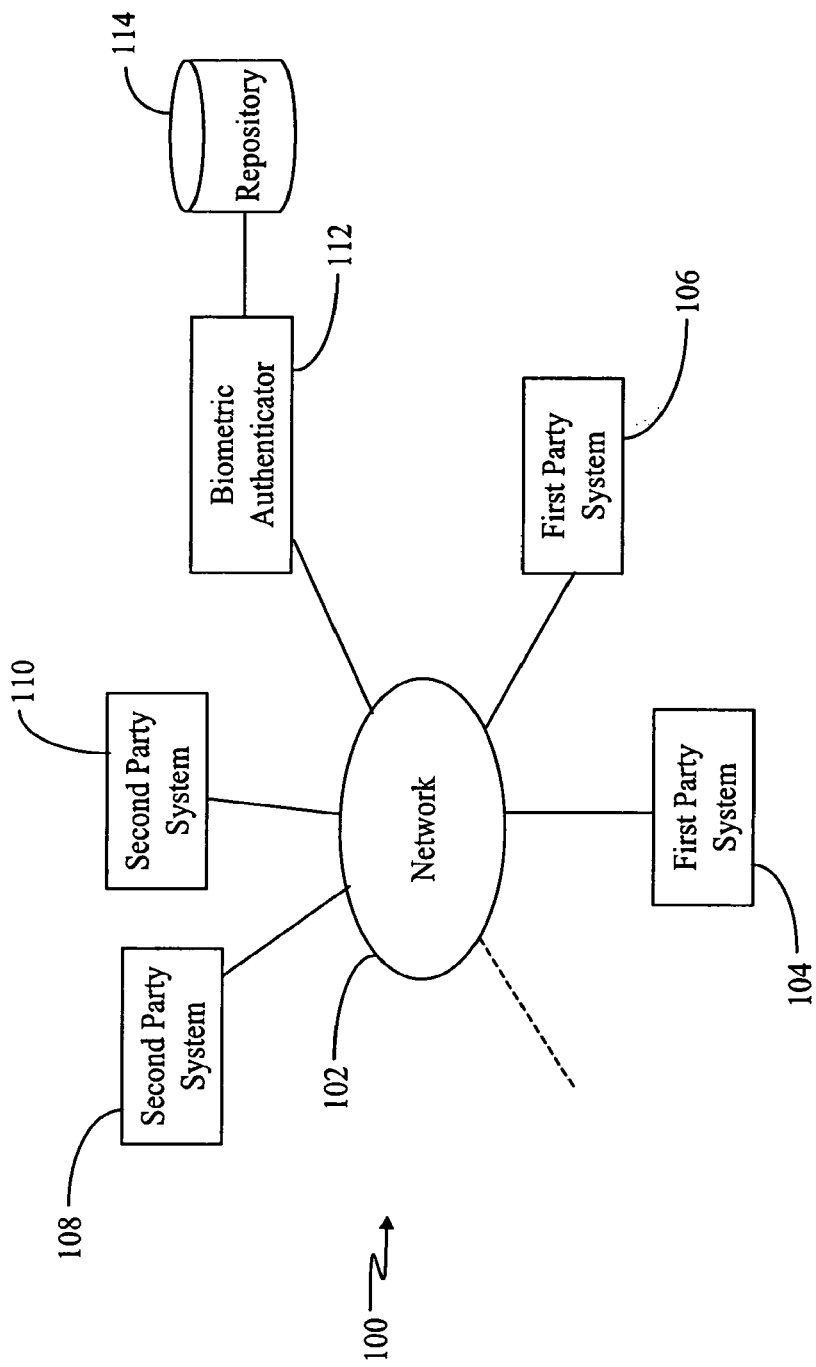
FIG. 1 shows an exemplary diagram of a third party biometric authentication system.

FIG. 1 shows an exemplary block diagram of a trusted third party biometric authentication system 100 that may include first party systems 104-106, second party systems 108-110, and a biometric authenticator 112 that maintains a repository 114. All of these components may be coupled via network 102. Network 102 may be any combination of networks such as internets, local area networks (LANs), wide area networks (WANs), wireless, wired, optical, etc. Biometric authenticator 112 may be a trusted independent party providing biometric authentication services to first and second parties 104, 106 and 108, 110, respectively. Second party systems 108 and 110 may be operated by various business entities, for example, such as a bank, a credit card company, a vendor, etc., that may engage in transactions with first parties operating first party systems 104-106, or immediately with first parties without the use of first party systems 104-106.

For example, a first party using first party system 104 may be engaged in an online banking transaction such as paying a bill with a bank that is using second party system 108. Before completing the transaction, second party system 108 may request biometric data from first party system 104 to confirm the identity of the first party. First party system 104 may issue a request to the first party for one or more of a retina scan, a fingerprint, a facial image, an ear scan, etc., using biometric data capture devices that may be coupled to first party system 104. After receiving the requested biometric data, first party system 104 may transmit the received biometric data to second party system 108 for authentication. Second party system 108 may request biometric templates from biometric authenticator 112 and perform the authentication process or forward the biometric data to biometric authenticator 112 for authentication. Alternatively instead of sending the biometric data to second party system 108, first party system 104 may be instructed to send the biometric data directly to biometric authenticator 112 for authentication.

A request for authentication and associated biometric data may be received with a claimed identification of a first party. Biometric authenticator 112 may use the claimed identity to search repository 114 for biometric templates belonging to that first party. Biometric data may not exactly match biometric templates. Thus, one or more thresholds may be established so that a confidence level may be established based on biometric data/biometric template(s) comparison(s). Biometric authenticator 112 may provide either an authentication certificate when comparison results exceed appropriate thresholds sufficiently to declare a "match," and/or a confidence score so that the second party may determine whether or not the authentication is successful. The second party may, for example, request additional biometric data possibly to increase the confidence score to a desired value. If an acceptable confidence score has been achieved, then the second party may choose to complete the associated transaction.

If the second party desires to perform the authentication process and requests one or more biometric templates for an identified party, biometric authenticator 112 may retrieve corresponding biometric templates based on the claimed identity of that parry, and transmit the biometric templates to second party system 108. In this way, second party system 108 may use its own matching techniques so that desired confidence levels may be obtained.

Text-independent speaker verification also may be used as a form of biometric authentication. For example, second party system 108 or biometric authenticator 112 may request the first party to speak a provided phrase to generate an audio signal. The audio signal received by a microphone of first party system 104 may be digitized into a voice print. Features extracted from the voice print may be transmitted to second party system 108 or to biometric authenticator 112 for comparison against appropriate templates. The voice print may also be transmitted and converted into an audio signal and output for audio confirmation by an operator in addition to automated authentication.

Biometric authenticator 112 may provide a first party identification based on provided biometric data as well as authenticate an identity of a first party based on the provided biometric data. For example, second party system 108 may send biometric data without also providing a corresponding claimed identity. Biometric authenticator 112 may search repository 114 for biometric templates that match the provided biometric data and return one or more identities that may correspond to the provided biometric data.

Repository 114 may provide a grouping of the biometric templates. Second party system 108 may send biometric data along with a group identifier. Biometric authenticator 112 may restrict the search for matching biometric templates only within the identified group, thus reducing a number of false positive identities. For example, a family might all use the same voicemail account, but have separate mail boxes. The voicemail system may obtain biometric data by requiring a first party accessing the voicemail to speak a pass phrase. When speech for the pass phrase is received as the biometric data, the voicemail system may send the biometric data along with an identifier for the family voicemail identified by the family name, for example. Biometric authenticator may restrict the search only to voice templates among those belonging to the family. Biometric authenticator may return an individual identity and a confidence score to the voicemail system for determination of whether to provide access to a correct mail box.

The phrase used in speaker verification may be generated by either the second party or biometric authenticator 112 in a manner that would make it difficult to predict its contents. The phrase may be generated from a large corpus of phrases, a source of random words, or spontaneously from a prior communication, for example. The generated phrases or words may be saved for each first party in repository 114 either for later use or for guaranteeing that the phrases are not used again. Instead of saving the used phrases or words, they may be deleted to avoid copying by imposters.

In view of the above, trusted third party biometric authenticator 112 may maintain security of repository 114, provide uniform and cost effective authentication services and relieve first and second parties of security tasks. For example, second parties are not required to maintain voice security for their services on their site or platforms and first parties are relieved of maintaining security of individual devices such as PDAs and laptops. Additionally, first parties may need to provide biometric data once for training templates and thus avoid template training process for every vendor that they deal with.

While the above discussion is based on an online banking example, other types of transactions may also take advantage of services of a biometric authenticator 112. For example, when engaged in an online purchase, a vendor may request biometric data from a prospective purchaser and request authentication of the prospective purchaser's identity in connection with a credit card. Biometric authenticator 112 may provide confirmation that the prospective purchaser is an authorized user of the credit card, for example. Additionally, the first party may not be using first party system 104. Instead, the first party may be physically at a second party facility engaged in a transaction with the second party. Prior to completing the transaction, the second party may request the first party to provide biometric data using biometric data recorders at the second party facility, for example. The transaction between the first and second parties may be completed upon successful authentication either by biometric authenticator 112 or by the second party using templates provided by biometric authenticator 112.

Figure 2:
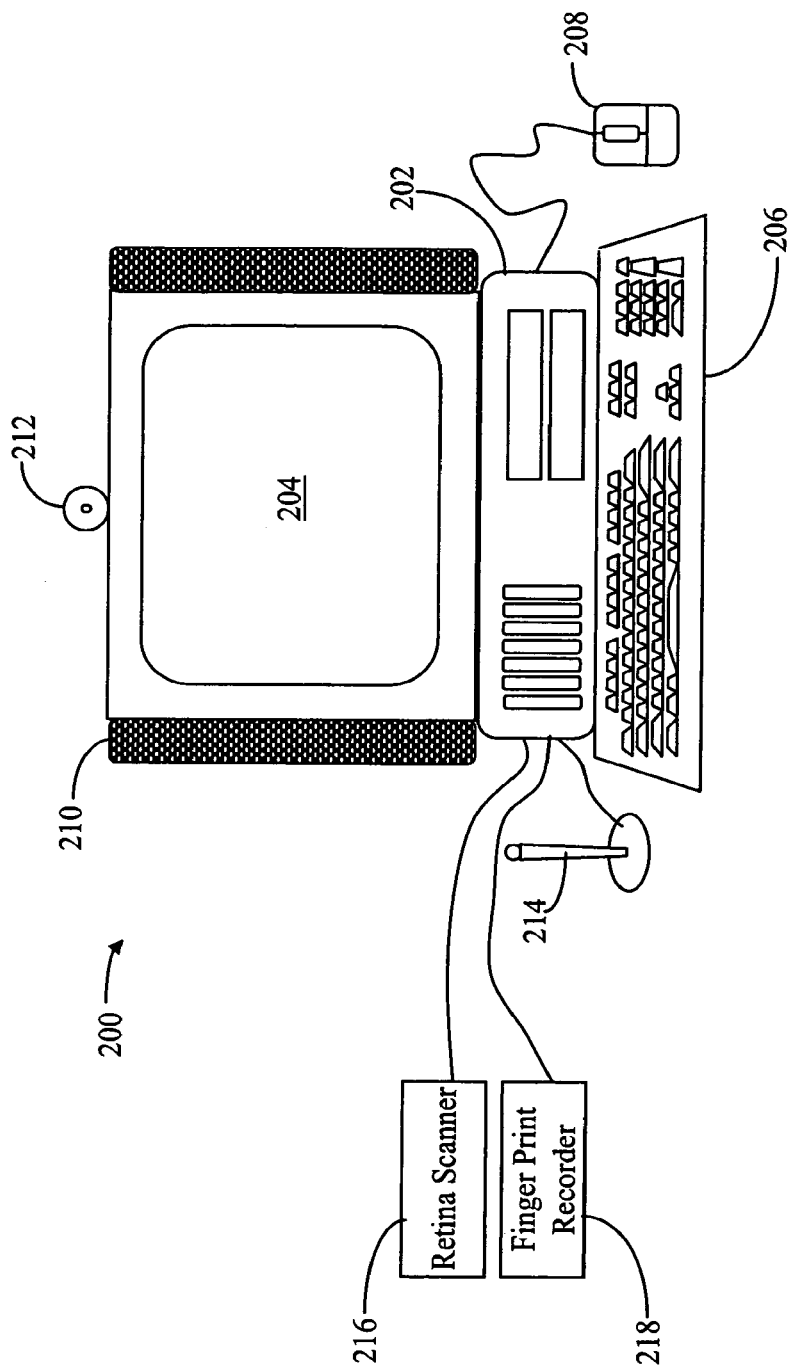
FIG. 2 shows an exemplary system for capturing biometric data.

FIG. 2 shows an exemplary end-user system 200 that includes a control processor 202, a display 204, a keyboard 206, a mouse 208, speakers 210, a camera 212, a microphone 214, a retina scanner 216 and a fingerprint recorder 218. While FIG. 2 shows that the end-user system 200 includes many different types of biometric data capture devices, 212-218, an end-user system may include any combination of one or more of these biometric capture devices 212-218 as well as other types of biometric data capture devices such as DNA profiler, ear scanner, etc. For example, end-user system 200 may include only microphone 214 to receive an audio input so that control processor 202 may generate a voice print. Also, biometric data capture devices 212-218 may be combined into a single device that is capable of capturing all types of the above-mentioned and other biometric data.

Additionally, while FIG. 2 shows biometric data capture devices 212-218 connected directly to control processor 202, they may be connected indirectly via a network such as network 102, for example. The biometric data capture devices 212-218 may be physically disposed in a remote location relative to controller processor 202. Also, end-user system 200 may represent first party systems 104-106, second party systems 108-110 or biometric authenticator 112. For example, if end-user system 200 represents first party system 104, then such a system may include only camera 212 and microphone 214 as biometric data capture devices. A first party may operate end-user system 200 using keyboard 206 and mouse 208 and input biometric data such as speech input via microphone 214 and facial image or ear scan via camera 212.

If end-user system 200 represents second party system 108, for example, then biometric data capture devices 212-218 may not be included at all and end-user system 200 may include only programs for requesting biometric data from first parties and biometric templates from biometric authenticator 112 and perform the authentication process. If authentication is performed by biometric authenticator 112, end-user system 200 may only include programs for interfacing with first parties and biometric authenticator 112.

Alternatively, second party systems 108-110 may include party registration facilities that provide biometric data capture devices for capturing biometric data from registering parties. For example, biometric capture devices 212-218 may be located in a specified area where registered parties may be instructed to provide their biometric data as part of a registration process. The data captured in this manner may be provided to biometric authenticator 112 for creation and storage of templates for future authentication processes. First parties may also perform the registration process using first party systems 104-106 that may collect biometric data as part of a service provided by a second party and/or the biometric authenticator 112.

If end-user system 200 represents biometric authenticator 112, then control processor 202 may be capable of high volume processing so that many different second party systems 108-110 may be supported. Biometric data capture devices 212-218 may be located in party registration facilities so that potential first parties may be registered with biometric authenticator 112 in addition to registration facilities that may be provided by second parties; as noted above.

Control processor 202 may be coupled to a mass storage device that serves as memory for repository 114. For example, FIG. 3 shows an exemplary data structure 240 for repository 114 that may include records 242-246 corresponding to each registered party, for example. Each of the records 242-246 may include an identification field 248, multiple biometric data entries 252 where each biometric data entry may include multiple fields 250. For example, record 242 may include entries for a retina scan, a fingerprint, a facial image, a voice print, etc. For example, fields 250 may include information such as a copy of actual biometric data, recordation date/time corresponding to the biometric data, a biometric template for each type of biometric data that may be generated via a training process during registration, etc.

FIG. 4 shows an exemplary table that may be indexed according to group identities. For example, FIG. 4 shows group identities n, n+1, . . . , n+p grouping groups m1, m2, . . . , mp first parties together, respectively. Pointers to records of the identified first parties form entries in the table so that biometric authenticator 112 may easily access biometric templates for each of the identified first parties when searching for a match to provided biometric data. Thus, when a second party requests retrieval of an identification for a provided biometric data for a particular group identity, biometric authenticator 112 may limit its search for a matching biometric template to only those identifications identified by the table under the provided group identity. Similarly, the second party may provide a claimed identity and a group identity so that biometric authenticator may determine whether the identity is included within the provided group identity even without performing biometric comparison between provided biometric data and biometric templates.

The above-discussed biometric data entries and corresponding fields are examples only. Other different types of biometric data and fields may be added, or only a subset of the above-discussed biometric entries 252 and fields 250 may be used. Also, while FIG. 3 shows biometric data stored in a table-like manner, other database structures may be used such as relational databases having indices, link lists, etc. Sophisticated database structures may be used in biometric authenticator 112 because a relatively large volume of biometric data may be stored.

The recordation date/time field of each biometric data entry may provide an indication of the age of the biometric data. Depending on the type of biometric data, such as facial image, a time limit may be set for updating the biometric data. For example, when an elapsed time threshold is exceeded, biometric authenticator 112 may issue requests for updates of biometric information or biometric data may be requested on a next opportunity when the associated registered party is engaged in a transaction, for example. Other adaptation schemes may also be used to update and improve the biometric templates such as using a difference between the received biometric data and a centroid of clusters in the biometric templates as a trigger to incorporate the received biometric data, for example.

Figure 5:
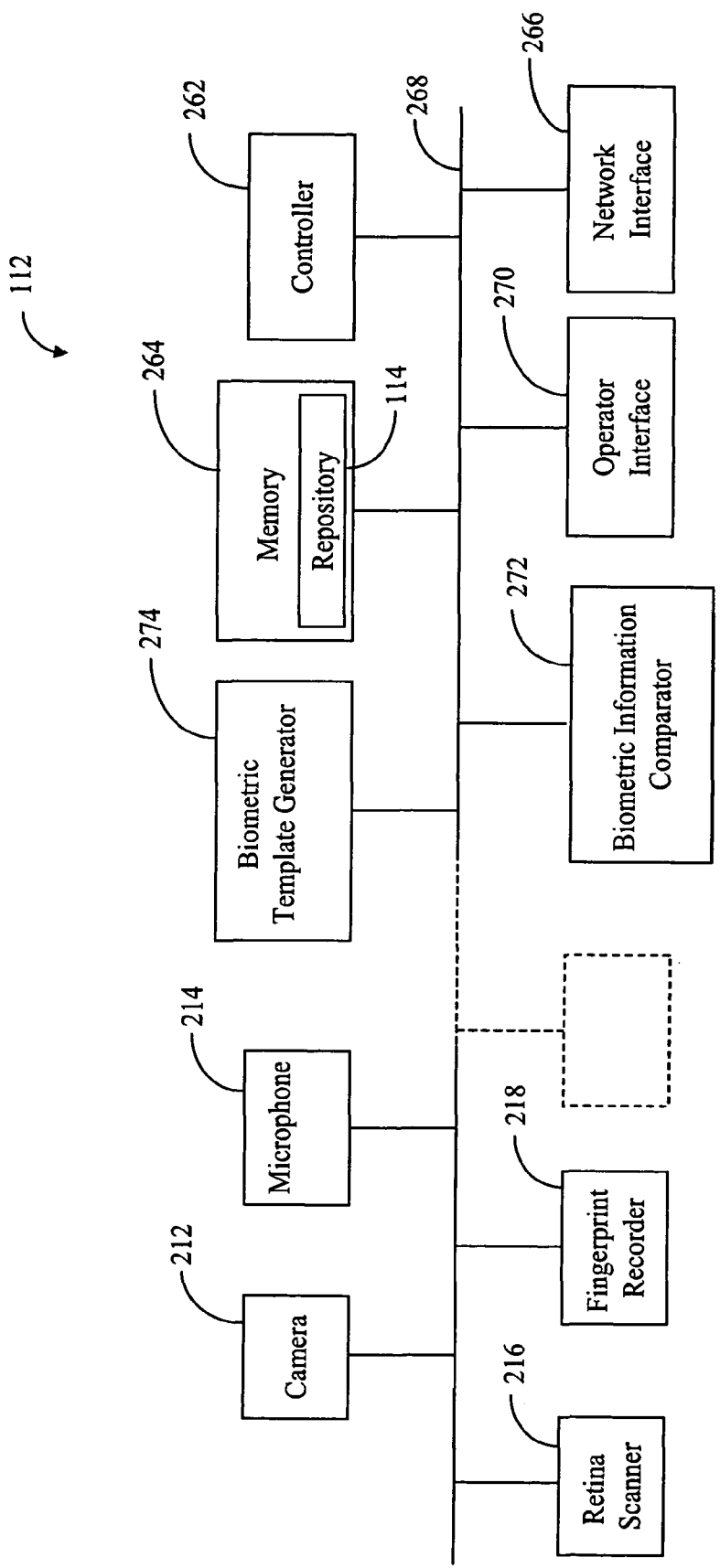
FIG. 5 shows an exemplary block diagram of a biometric authenticator.

FIG. 5 shows an exemplary block diagram of biometric authenticator 112 that may include a controller 262, a memory 264, an operator interface 270, a biometric information comparator 272, a biometric template generator 274, and a network interface 266. Memory 264 may comprise one or more mass storage devices such as ROM, RAM, optical disk(s), hard disk(s), etc. Repository 114 may be stored in memory 264. Repository 114 may be stored elsewhere but is shown stored in memory 264 for convenience. These components may be coupled by a bus 268. The comparator and the template generator may be software systems that may run on separate processors or on the same processor.

As mentioned above, biometric authenticator 112 may be connected to biometric data capture devices 212-218. The biometric data capture devices 212-218 may be either directly coupled to controller 262 via bus 268 or remotely connected (as shown by dashed lines) when biometric data capture devices 212-218 are physically disposed in a location remote from controller 262. Also, many copies of biometric data capture devices 212-218 may be provided so that party registration may be efficiently performed with many registering parties. The data capture devices may be part of a first party system 104-106. The first party may be requested to use these devices as part of a registration process operating on a second party system 108-110, or as part of a registration process operating on biometric authenticator 112. Further, the data capture devices 212-218 may be part of one or more second party systems 108-110 and used as part of a registration process. For example, a first party may be using an Automatic Teller Machine (ATM) at a bank for the first time. The ATM may request that the first party provide a finger print or a voice sample for creating a biometric template.

While FIG. 5 shows biometric authenticator 112 using a bus architecture, any type of hardware architecture, including wired and wireless networks, may be used based on implementation details. For example, biometric data capture devices 212-218 may be coupled to bus 268 via network interface devices and memory 264, operator interface 270 and network interface 266 may be individually connected to controller 262. Also, these hardware components may be implemented using any available hardware technology such as FPGA, PAL, application specific integrated circuits (ASICs), etc.

When a request for biometric authentication is received via network interface 266, controller 262 may retrieve one or more biometric templates and/or data from repository 114 such as from memory 264, for example. Controller 262 may direct the templates to be sent to biometric information comparator 272 together with the received biometric data.

Biometric information comparator 272 may compare the received biometric information (biometric template(s) and/or data) against the one or more retrieved biometric information and determine whether the result of the comparison exceeds one or more thresholds corresponding to confidence levels, for example. Controller 262 may send the confidence level to the requesting second party via network interface 266 and/or an authentication certificate if a highest confidence level has been exceeded. If the comparison result fails to exceed a minimum threshold, for example, then controller 262 may issue an authentication failure message to the requesting second party via network interface 266. If instead of a request for authentication, biometric authenticator 112 received a request for biometric information, controller 262 may retrieve requested information such as biometric templates from repository 114 and forward the biometric information to the requesting second party via network interface 266.

If a first party desires to register biometric data with a second party, the second party may issue a prompt to the registering first party via a display (not shown), for example, to request the registering first party to provide the biometric data via one or more of biometric data recording devices provided by the second party Once received, the second party may send the collected biometric data to biometric authenticator 112. When received via network interface 266, for example, controller 262 may direct the received biometric data to biometric template generator 274 to generate one or more biometric templates. If additional samples of biometric data are required, controller 262 may make a request to the second party to again prompt the registering first party to provide the needed additional biometric data. When all the needed one or more biometric templates are generated, controller 262 may add a new biometric record in repository 114 and record the new biometric template(s) in the created biometric record together with recordation date and time, for example. Alternatively, the second party may transfer control over to biometric authenticator 112 for the complete registration process including interfacing with the registering first party.

Repository 114 may be used by many second party systems 108-110 for authenticating registered first parties to complete transactions. As noted above, second party systems 108-110 may also register first parties and either the biometric data and/or the generated templates may be provided to biometric authenticator 112 for storage in repository 114. Registered first parties may engage in transactions with many different second parties so that significant overlap may occur among patrons of various second parties. Thus, repository 114 managed by biometric authenticator 112 may provide a cost effective authentication service without requiring first parties to repeat registration processes with multiple second parties.

When a second party registers a first party, the collected biometric information together with the identification provided by the first party may be transmitted to biometric authenticator 112. Biometric authenticator 112 may perform a search of repository 114 to determine whether the biometric information corresponding to the identified party is already in repository 114. If biometric information is already in repository 114, biometric authenticator 112 may compare the biometric information retrieved from repository 114 against the newly provided biometric information to determine whether the two sets of biometric information are substantially identical or substantially different. If the two sets of biometric information are substantially identical, biometric authenticator 112 may either store both sets of biometric information or select one of the sets for storage. If the two sets of biometric information are substantially different, then a message to that effect may be returned to the second party who may take various actions such as request additional biometric data, alert authorities for possible security breach, etc.

Further, biometric authenticator 112 may search repository 114 to determine whether the newly provided biometric information match biometric information that correspond to an identity that is different than that provided by the registering first party. If one or more matches are found, then a warning may be sent to the second party, for example. In this way, unique correspondence between biometric information and identities may be maintained.

Figure 6:
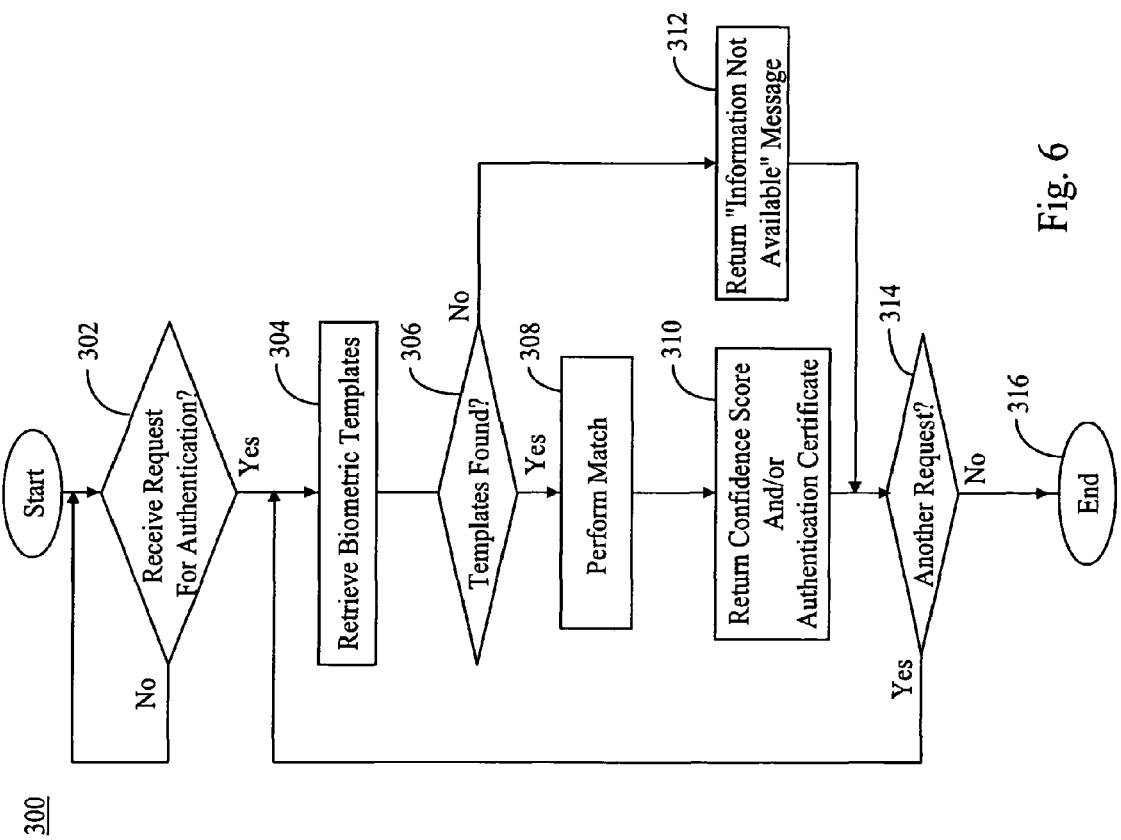
FIG. 6 shows a flowchart of an exemplary process for authenticating an identity of a party.

FIG. 6 shows a flowchart 300 of an exemplary biometric authenticator process for confirming identity of a first party. In step 302, the process determines whether a request for authentication is received. If a request is received, the process goes to step 304; otherwise, the process returns to step 302. In step 304, the process attempts to retrieve from a repository biometric information corresponding to the received identity and goes to step 306. In step 306, the process determines whether biometric information corresponding to the received identity is found in the repository 114. If the biometric information is found, the process goes to step 308; otherwise, the process goes to step 312.

In step 308, the process determines whether the received biometric information matches the retrieved biometric information based on one or more thresholds and goes to step 310. In step 310, the process returns to the requesting second party a confidence score corresponding to exceeded thresholds and/or an authentication certificate if a highest threshold was exceeded and goes to step 314. In step 312, the process returns a message indicating that information is not available for authentication, and the process goes to step 314. In step 314, the process determines whether another request for authentication is received. If another request is received, the process returns to step 304; otherwise, the process goes to 316 and ends.

Figure 7:
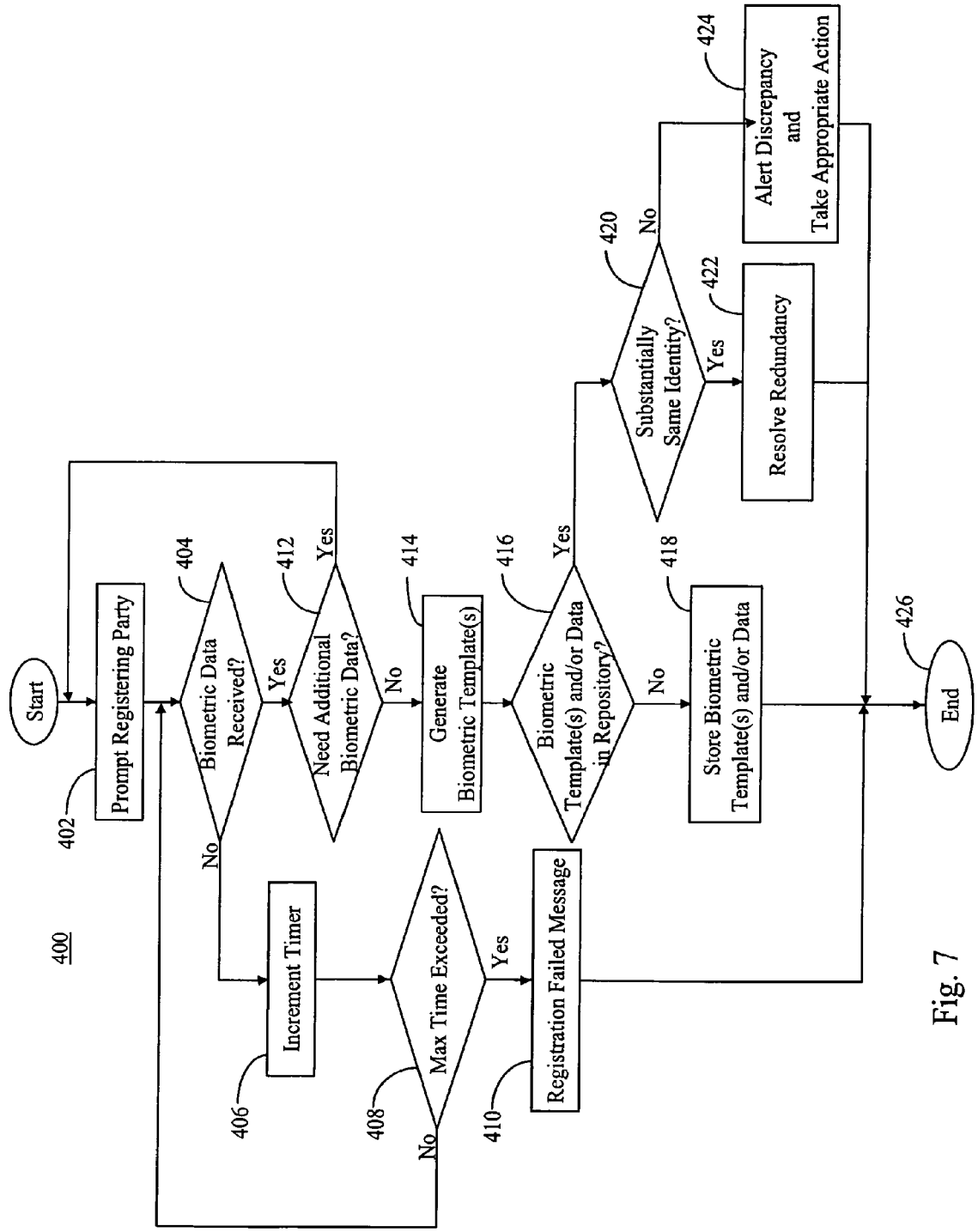
FIG. 7 shows a flowchart of an exemplary process for registering first parties.

FIG. 7 shows a flowchart 400 of an exemplary process for registering a first party. In step 402, the process prompts the registering first party to provide biometric data via one or more biometric data capture device and goes to step 404. In step 404, the process determines whether the requested biometric data has been received. If the requested biometric data has been received, the process goes to step 412; otherwise, the process goes to step 406. In step 406, the process increments a timer and goes to step 408. In step 408, the process determines whether a maximum time has been exceeded. If the maximum time has been exceeded, the process goes to step 410; otherwise, the process returns to step 404. In step 410, the process issues a registration failed message and goes to step 426 and ends.

In step 412, the process determines whether additional biometric data is required to generate one or more biometric templates. If additional biometric data is required, the process returns to step 402; otherwise, the process goes to step 414. In step 414, the process generates one or more biometric templates and goes to step 416.

In step 416, the process determines whether the received biometric data and/or the generated biometric templates (biometric information) are substantially the same as ones that are already in the repository. If substantially the same biometric information is already in the repository, the process goes to step 420; otherwise the process goes to step 418. In step 420, the process determines whether the identity provided by the registering party is substantially the same as the identity that corresponds to the biometric information already in the repository. If the identities are substantially the same, the process goes to step 422; otherwise, the process goes to step 424. In step 422, the process resolves the redundancy between the biometric information of the registering party by discarding one of the biometric information or by storing both copies and goes to step 426 and ends. In step 424, the process generates a discrepancy alert to the biometric authenticator operator, for example, and take appropriate action such as alerting enforcement personnel and goes to step 426 and ends. In step 418, the process stores the generated biometric information into the repository and goes to step 426 and ends.

While the invention has been described in conjunction with exemplary embodiments, these embodiments should be viewed as illustrative, not limiting. Various modifications, substitutes or the like are possible within the spirit and scope of the invention.

The invention claimed is:

1. A method, comprising:
   receiving, by a server, an authentication request associated with a first party, the authentication request requesting a third party to authenticate an electronic transaction associated with the first party and associated with an identity claimed by a second party;
   querying, by the server, an electronic database for the identity claimed by the second party, the electronic database electronically associating biometric templates and identities including the identity claimed by the second party;
   identifying, by the server, a biometric template of the biometric templates in the electronic database that is electronically associated with the identity claimed by the second party;
   retrieving, by the server, a randomly selected portion of biometric data associated with the second party to the electronic transaction;
   comparing, by the server, the randomly selected portion of the biometric data associated with the second party to the biometric template electronically associated with the identity claimed by the second party;
   determining, by the server, that the randomly selected portion of the biometric data satisfies a confidence threshold associated with the biometric template that is electronically associated with the identity claimed by the second party; and
   determining, by the server, an authentication response to the authentication request, the authentication response based on the randomly selected portion of the biometric data satisfying the confidence threshold associated with the biometric template.

2. The method of claim 1, further comprising authenticating the second party to the electronic transaction.

3. The method of claim 1, further comprising failing an authentication of the second party in response to the randomly selected portion of the biometric data failing to satisfy the confidence threshold associated with the biometric template.

4. The method of claim 1, further comprising scoring the comparing of the randomly selected portion of the biometric data to the biometric template.

5. The method of claim 1, further comprising retrieving speech data associated with the second party.

6. The method of claim 1, further comprising retrieving a randomly selected phrase that was previously spoken by the second party during a prior conversation with the first party.

7. The method of claim 1, further comprising generating an alert in response to the randomly selected portion of the biometric data failing to satisfy the confidence threshold associated with the biometric template.

8. A system, comprising:
   a processor; and
   a memory device, the memory device storing code, the code when executed causing the processor to perform operations, the operations comprising:
   receiving an authentication request associated with a first party, the authentication request requesting a third party to biometrically authenticate an electronic transaction associated with the first party and associated with an identity claimed by a second party to the electronic transaction;
   querying an electronic database for the identity claimed by the second party, the electronic database electronically associating biometric templates and identities including the identity claimed by the second party;
   identifying a biometric template of the biometric templates in the electronic database that is electronically associated with the identity claimed by the second party;
   retrieving a randomly selected portion of historical biometric data that is commonly associated with both the first party and with the second party;
   comparing the randomly selected portion of the historical biometric data to the biometric template identified in the electronic database;
   determining the randomly selected portion of the historical biometric data commonly associated with both the first party and with the second party satisfies a confidence threshold associated with the biometric template identified in the electronic database; and
   sending an authentication response to the authentication request, the authentication response confirming a biometric authentication of the identity claimed by the second party.

9. The system of claim 8, wherein the operations further comprise determining the randomly selected portion of the historical biometric data fails to satisfy the confidence threshold associated with the biometric template.

10. The system of claim 9, wherein the operations further comprise denying an authentication of the second party.

11. The system of claim 8, wherein the operations further comprise scoring the comparing of the randomly selected portion of the historical biometric data to the biometric template.

12. The system of claim 8, wherein the operations further comprise retrieving speech data associated with the second party.

13. The system of claim 8, wherein the operations further comprise retrieving a randomly selected phrase that was previously spoken by the second party during a prior conversation with the first party.

14. The system of claim 8, wherein the operations further comprise generating an alert in response to the randomly selected portion of the biometric data failing to satisfy the confidence threshold associated with the biometric template.

15. A memory device storing instructions that when executed cause a processor to perform operations, the operations comprising:
   receiving, by the processor operatively coupled to the memory device, an authentication request associated with a first party, the authentication request requesting a third party to biometrically authenticate an electronic transaction associated with the first party and associated with an identity claimed by a second party to the electronic transaction;

querying, by the processor operatively coupled to the memory device, an electronic database for the identity claimed by the second party, the electronic database electronically associating biometric templates and identities including the identity claimed by the second party;

identifying, by the processor operatively coupled to the memory device, a biometric template of the biometric templates in the electronic database that is electronically associated with the identity claimed by the second party;

retrieving, by the processor operatively coupled to the memory device, a randomly selected portion of historical biometric data that is commonly associated with both the first party and with the second party;

comparing, by the processor operatively coupled to the memory device, the randomly selected portion of the historical biometric data to the biometric template identified in the electronic database;

determining, by the processor operatively coupled to the memory device, the randomly selected portion of the historical biometric data commonly associated with both the first party and with the second party satisfies a confidence threshold associated with the biometric template identified in the electronic database; and sending, by the processor operatively coupled to the memory device, an authentication response to the authentication request, the authentication response confirming a biometric authentication of the identity claimed by the second party.

16. The memory device of claim 15, wherein the operations further comprise determining the randomly selected portion of the historical biometric data fails to satisfy the confidence threshold associated with the biometric template.

17. The memory device of claim 16, wherein the operations further comprise denying an authentication of the second party.

18. The memory device of claim 15, wherein the operations further comprise scoring the comparing of the randomly selected portion of the historical biometric data to the biometric template.

19. The memory device of claim 15, wherein the operations further comprise retrieving a randomly selected phrase that was previously spoken by the second party during a prior conversation with the first party.

20. The memory device of claim 15, wherein the operations further comprise generating an alert in response to the randomly selected portion of the biometric data failing to satisfy the confidence threshold associated with the biometric template.

* * * * *